PREFABRICATED COMMUNICATION LINE SYSTEM

Filed Jan. 30, 1968

INVENTOR.
*Edward Clarke Quackenbush*
BY
*Blair Buckles Cesari & St. Onge*
ATTORNEYS May 5, 1970 E. C. QUACKENBUSH 3,510,825

PREFABRICATED COMMUNICATION LINE SYSTEM

Filed Jan. 30, 1968 5 Sheets-Sheet 2

United States Patent Office 3,510,825
Patented May 5, 1970

3,510,825
PREFABRICATED COMMUNICATION LINE SYSTEM

Edward Clarke Quackenbush, Woodbridge, Conn., assignor to The Whitney Blake Company, New Haven, Conn.

Filed Jan. 30, 1968, Ser. No. 701,587
Int. Cl. H01r *11/00*
U.S. Cl. 339—29 4 Claims

ABSTRACT OF THE DISCLOSURE

Disclosed herein is a prefabricated communication line system which eliminates the need for making splices and tap-off electrical connections in the field. The system comprises a plurality of predetermined lengths of communication cable having plugs at either end, electrically interconnected by a plurality of modular intermediate sockets. Both the plugs and sockets are made weather-tight and provided with strong mating housings for outdoor applications.

Terminals are provided in the intermediate sockets for connection of tap-off lines used as "drop-wires" or for the interconnection of repeaters or testing instrumentation with the system.

Interchangeable plugs are used on either end when the lengths of communication cable are long and heavy and difficult to manipulate. In such cases the terminals at either end of each intermediate socket and which interconnect the cable lengths are transpositioned to provide electrical continuity through the socket.

BACKGROUND OF THE INVENTION

The installation of communication line systems and in particular outdoor systems for telephonic communication entails a great amount of labor in the field and accordingly is an expensive operation. Communication cable having a core comprising hundreds of wire pairs for example, is supplied to the telephone linemen on reels holdings up to 10,000 feet of cable. The linemen must then string the cable from poles, or through conduit in the case of underground systems, making splices or tap-offs in situ where required for distribution branch lines, for "dropwires" to individual customers, or for the installation of repeaters or testing instrumentation. Each such splice or tap-off may require the making of a hundred or more individual connections between the wire pairs of the cable, and the wire pairs of a branch line or the terminals of a piece of communication system equipment.

Such splices and tap-offs must be made under field conditions; this usually means that installation will occur in elevated and/or cramped outdoor locations where precise work is exceedingly difficult. Accordingly, a great deal of installation time is required to optimize the accuracy and quality of the electrical connections. Still further time is required to check the connections upon the completion of installation and to correct errors or improper connections. Also, splices and tap-offs made under field conditions canont be expected to perform as reliably as, for example, similar factory-made connections, and maintenance of existing communication lines is therefore expensive.

Accordingly, representative objects of the present invention are to provide a prefabricated modular communication line system in which lengths of cable can be prewired with connecting plugs at the factory for accuracy, and to provide novel means for interconnecting such prefabricated lengths of cable to form communication lines and for providing predetermined tap-offs for drop-wires, repeaters, testing equipment and the like.

Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

SUMMARY OF THE INVENTION

The present invention relates to a prefabricated modular communication line system and to the component parts which make up the system.

Referring to FIG. 1, there is shown a portion of an overhead prefabricated communication line system in accordance with the invention. The system is prefabricated in the sense that the number and lengths of cable units needed for the system are predetermined and factory assembled for shipment to the system site; there, linemen need only string the cable units from poles (or through conduit in the case of underground systems) and interconnect the individual cable units by means of the modular intermediate sockets more fully described herein to form a complete communication line system. The invention thus greatly reduces the required field work and increases reliability of on-site electrical connections heretofore necessary in the construction of a communication line system. The use of modular factor-made electrical connections also makes for a more reliable system which is less susceptible to breakdown and requires less maintenance.

More specifically, as shown in FIG. 1, a plurality of lengths of communication cable 10 having a core comprising a plurality of wire pairs, are each provided with multi-pin cable connector plugs 12 at each end to form a plurality of cable units 14. Plugs 12 are interchangeable and are mounted to the lengths of cable 10 prior to shipment to the site of the erected communication line so that all electrical connections between plug 12 and the wire pairs forming the core of cable 10 can be made under factory conditions for accuracy and dependability.

The cable units 14 are erected as shown in FIG. 1. A messenger wire 18 strung from pole to pole and affixed to each pole 16 by a tangent support 20 holds the cable units 14 in suspension by means of a plurality of hangers 22.

A plurality of modular intermediate sockets, one of which is shown generally at 24 in FIG. 1, each mate with a pair of plugs 12 on adjacent ends of two separate cable units 14 to electrically interconnect the wire pairs in the cable units and link them into the continuous communication line system of the invention. The weight of socket 24 may be supported on messenger wire 18 by means of a strap 25 or the like.

Preferably, at least selected ones of the sockets 24 include means more fully described herein which permit a tap-off cable 26, having a plug 28 (FIG. 1) similar to plug 12, to be tapped-in to all or selected wire pairs. Tap-off cable 26 may be used as a "drop-wire" to an individual customer or for the connection of repeaters or testing equipment into the system.

BRIEF DESCRIPTION OF THE DRAWINGS

For a fuller understanding of the nature and objects of the invention, reference should be had to the following detailed description taken in connection with the accompanying drawings, in which.

Similar reference characters refer to similar parts throughout the several views of the drawings.

DESCRIPTION OF THE PREFERRED EMBODIMENTS

Figure 2:
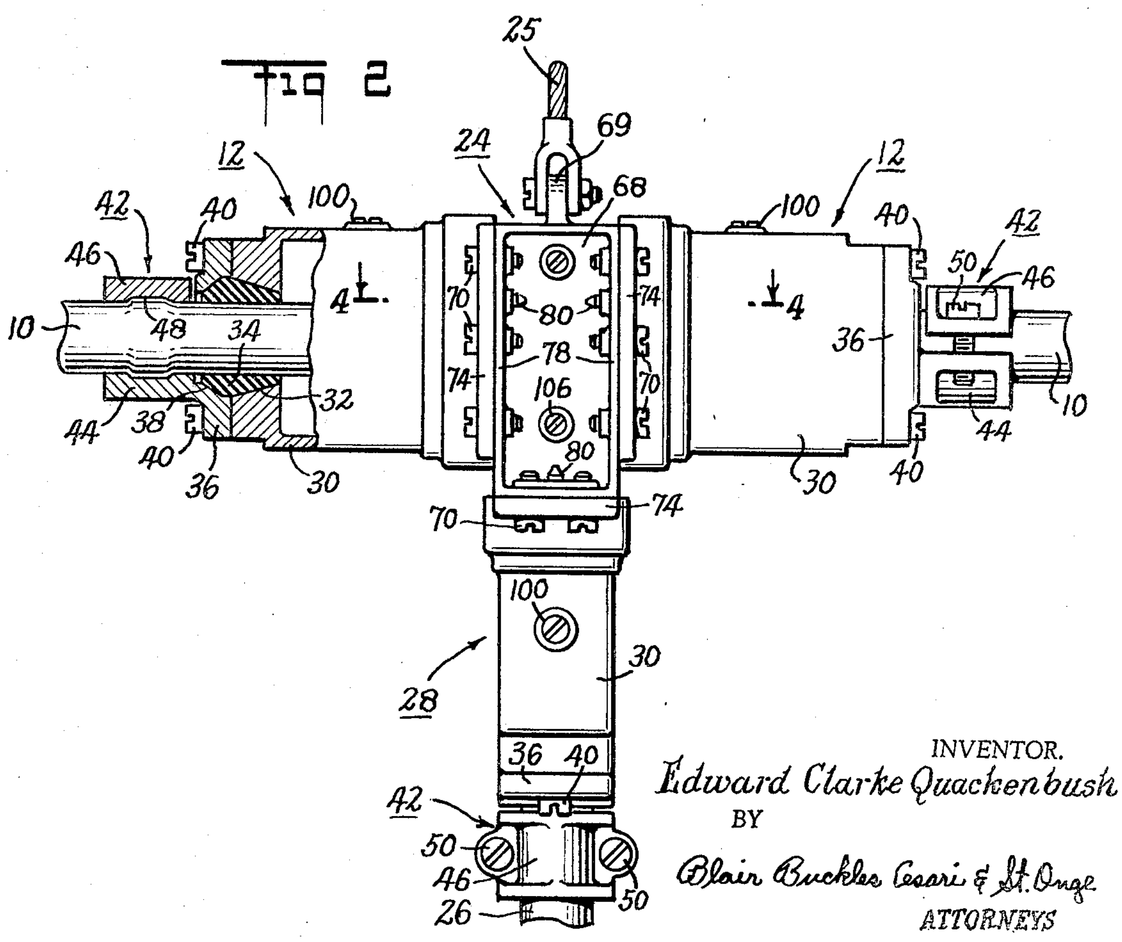
FIG. 2 is an enlarged front elevation view, partly in section, of the cable unit plugs, modular intermediate connector, and tap-off plug of the communication line system of FIG. 1, shown in assembly.
Figure 3:
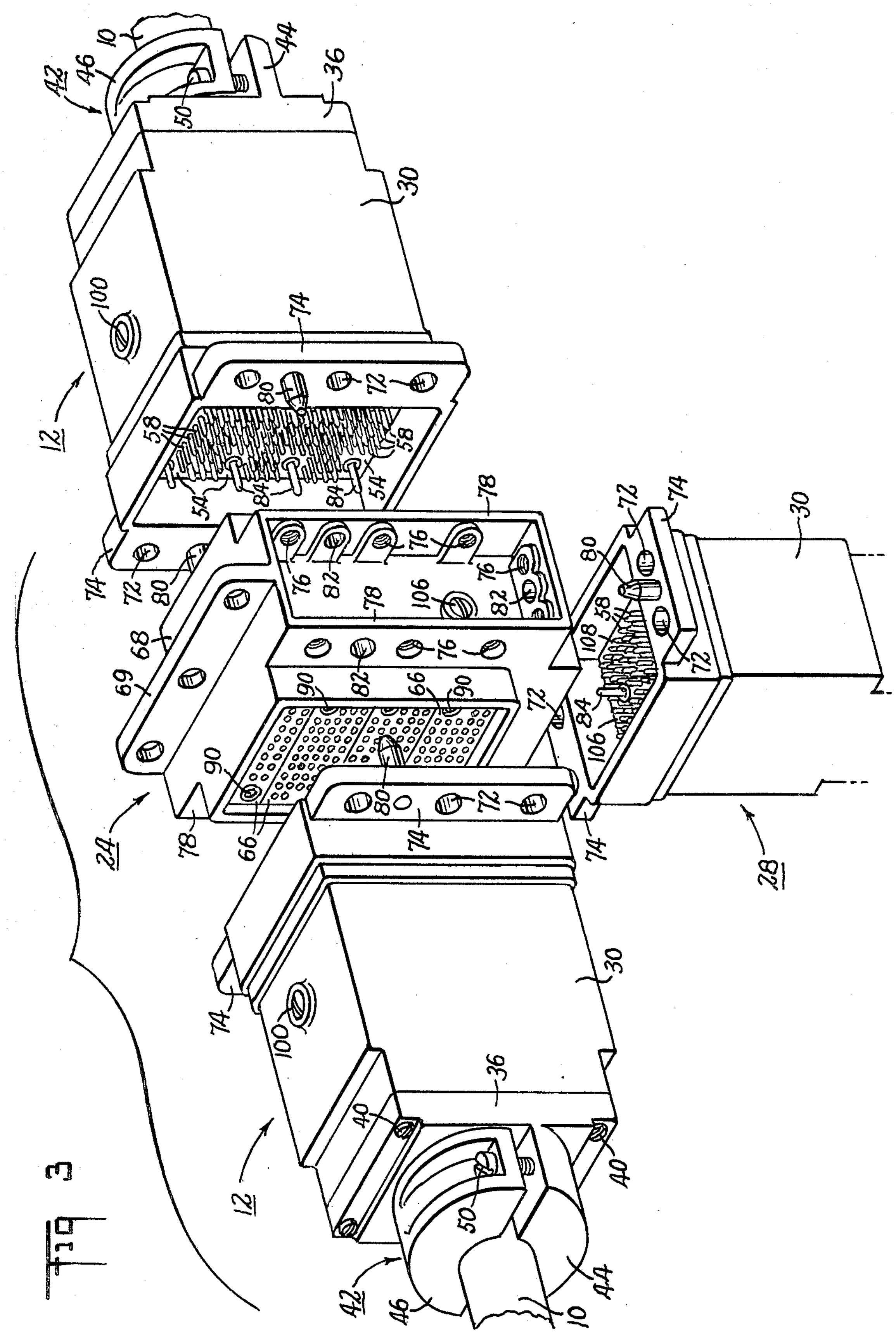
FIG. 3 is an enlarged exploded perspective view of the apparatus of FIG. 2.

Referring now to FIGS. 2 and 3, a plug 12 is secured to each end of a length of communication cable 10 to form each cable unit 14 of the invention. Preferably, the plugs at each end of each cable unit 14 are interchangeable so that any readily accessible end can be used for interconnection with the intermediate socket 24. This eliminates any possibility of a line-man having to manipulate heavy and unwieldly lengths of cable to gain access to the proper plug 12 during assembly of the communication line system.

As shown in FIG. 2, a plug housing 30 made from a suitable metallic or resinous plastic material, e.g. cast aluminium alloy, is fitted over the end of a length of communication cable 10 which is received through aperture 32 in the rear of plug housing 30. A grommet 34 of resilient material such as rubber is fitted into aperture 32 around cable 10. A closure plate 36 suitably beveled about a central aperture 38 is fastened to the rear of plug housing 30 by means of cap screws 40, and beveled aperture 38 serves to compress grommet 34 about the end of cable 10 to form a weather-tight seal for the interior of plug 12. A clamp 42 having a lower C-shaped portion 44 affixed to plate 36, and a similarly shaped but separate upper portion 46, free for compressive movement toward lower portion 44, surrounds cable 10 to the rear of plate 36. The inner surface 48 of clamp 42 is provided with a groove (FIG. 2). Upon the tightening of a pair of cap screws 50 passing through upper portion 46 and threadably received in lower portion 44, clamp 42 is compressed about cable 10 which interlocks with the grooved inner surface 48 to prevent movement of plug 12 along cable 10 and resultant strain on electrical connections therein.

Figures 4, 5:
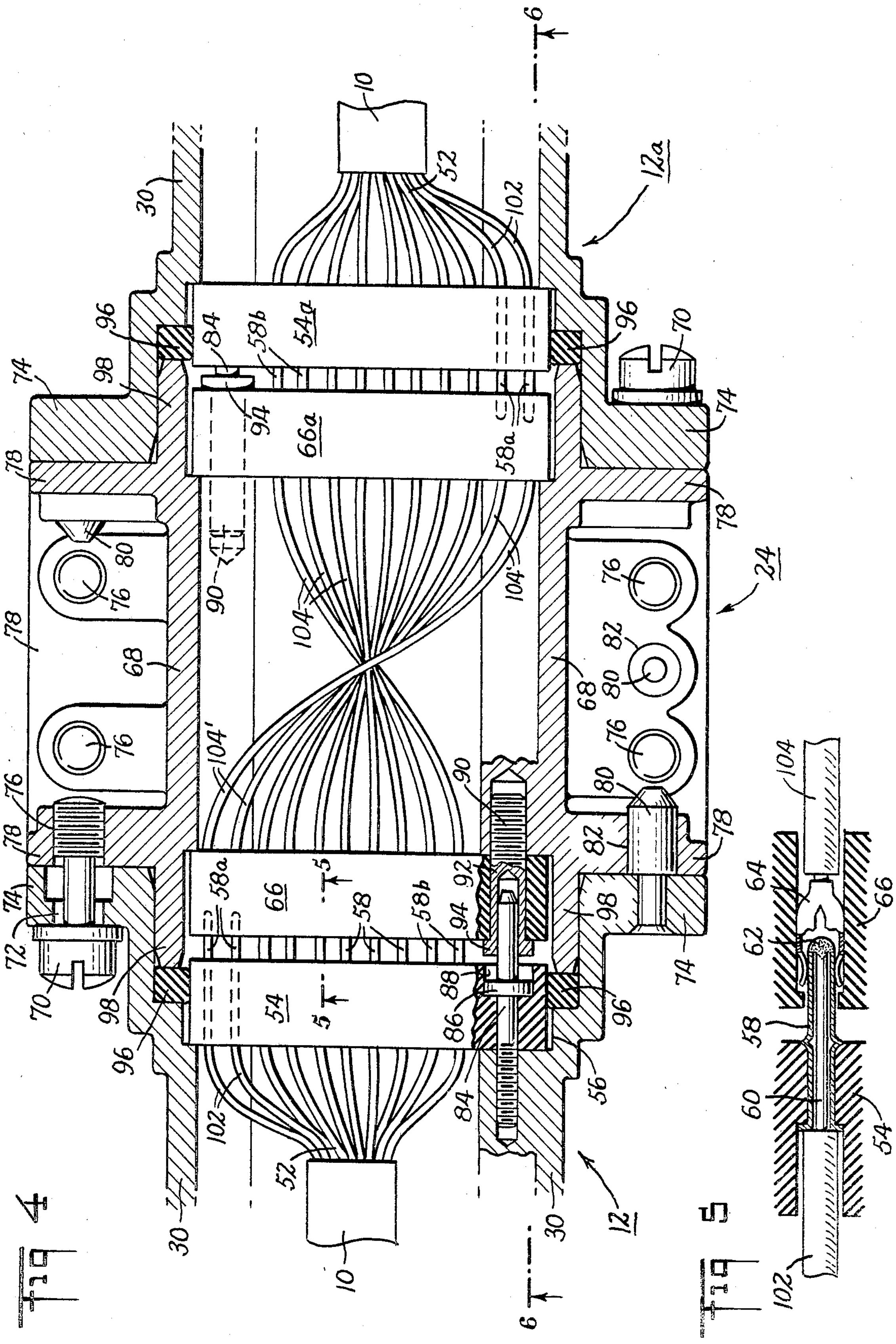
FIG. 4 is an enlarged partial sectional view taken along line 4—4 of FIG. 2.
FIG. 5 is an enlarged partial sectional view taken along line 5—5 of FIG. 4.

The interior of plug 12 is shown in FIG. 4. The individual wire pairs forming the core 52 of cable 10 are spread out and electrically connected to terminal pins of one or more plug terminal blocks 54 of insulating material, positioned in a suitable recess 56 adjacent the open end of plug 12. As shown in FIG. 3, a plurality of terminal pins 58 are molded or inserted into the terminal blocks 54 in each plug 12 and project toward the open end thereof. Pins 58 are preferably hollow (FIG. 5) and the stripped end 60 of each wire of cable core 52 is inserted into one pin 58, and secured by solder 62 at the end thereof, for example by dip soldering, for an electrical connection.

To form the communication line system of the invention, plugs 12 at the ends of separate cable units 14 are mated with modular intermediate sockets 24 as shown in FIGS. 2 and 4. The terminal pins 58 of each plug 12 are frictionally received within corresponding terminal sleeves 64 (FIG. 5) in one or more socket terminal blocks 66 mounted adjacent an open side of a socket housing 68 (FIG. 4).

Figure 1:
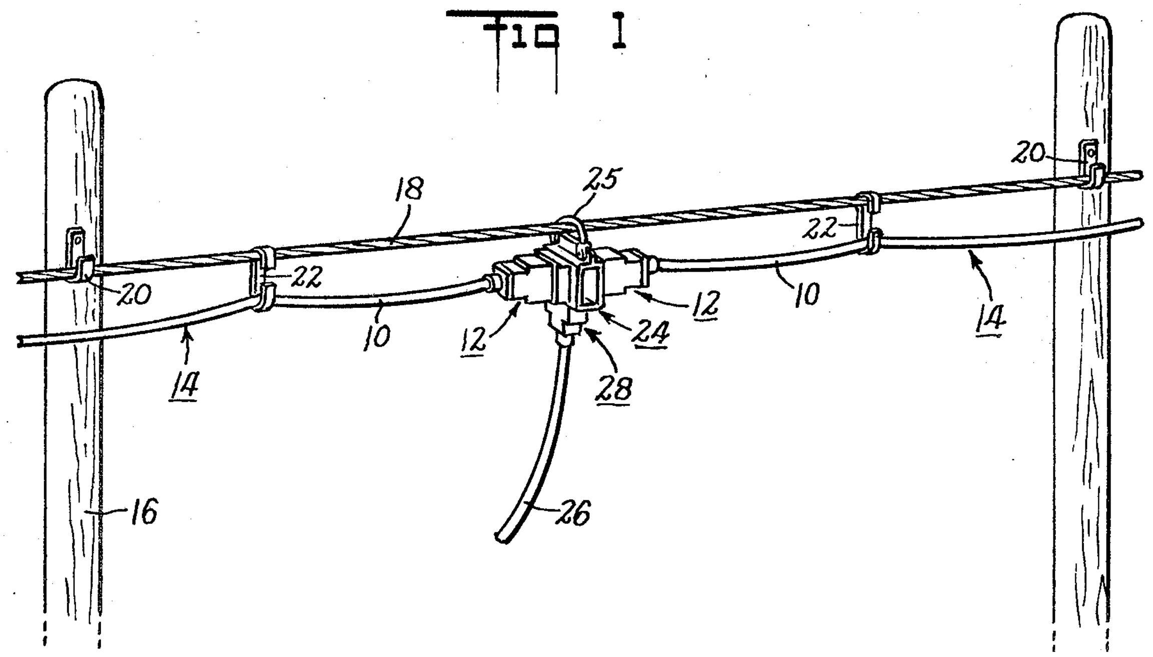
FIG. 1 is a perspective view of an outdoor overhead communication line system in accordance with the invention.

Socket housing 68 is preferably formed of the same material as plug housing 30, and a flange 69 (FIG. 3) is provided on the top surface of socket housing 68 to permit the attachment of strap 25 (FIG. 2) by which socket 24 is suspended as shown in FIG. 1.

A plurality of cap screws 70 passing through holes 72 in a flange 74 at either side of plug housing 30 (FIGS. 2 and 3) are threadedly engaged in tapped holes 76 in flanges 78 on socket housing 68 to secure plug 12 to socket 24.

To insure the correct orientation between plug 12 and socket 24, coding pins 80 may be provided in the flanges 74 of each plug 12 (FIGS. 3 and 4). Corresponding coding pin guide holes 82 are provided in the flanges 78 of socket housing 68 to receive the coding pins 80. As shown in FIG. 3, the coding pins 80 and coding pin guide holes 82 are asymmetrically spaced on their respective flanges so that only one proper mating position is possible.

Means are also provided to insure proper alignment of the terminal pins 58 in plug 12 with their corresponding terminal sleeves 64 in modular intermediate socket 24. As shown in FIGS 3 and 4, an alignment stud 84 passes through diagonally spaced corners of each plug terminal block 54 into threaded engagement with plug housing 30. A shoulder 86 on each alignment stud 84 is received within a countersink 88 in the face of each plug terminal block 54, and thus serves both to clamp the terminal block within plug housing 30 and as a stop to insure the proper amount of protrusion of stud 84. Studs 84 are received within an alignment stud guide 90 upon assembly of plug 12 with socket 24 (FIG. 4). Each guide 90 comprises a sleeve 92 passing through its respective socket terminal block 66 and threadedly engaging the socket housing 68. A flanged head 94 on each guide 90 serves to secure each socket terminal block 66 in its respective socket housing 68.

Plug 12 and socket 24 may also be provided with mating tubular elements which allow gases to freely communicate therebetween, thereby enabling the system of the invention to be gas pressurized where desired.

A weather-tight seal may be provided between plug 12 and the socket 24 with which it is mated for outdoor applications. A continuous gasket 96 is provided around the plug terminal blocks 54 in plug housing 30 as shown in FIG. 4. Gasket 96 is preferably a resilient, relatively moisture impervious material such as rubber, cork or the like. Upon assembly with a socket 24, gasket 96 is compressively engaged by the continuous protruding rim 98 on socket housing 68 which surrounds the socket terminal blocks 66. The compressive interengagement of gasket 96 and rim 98 serves to seal the interiors of socket 24 and associated plug 12 against moisture, dirt and other contaminants in the atmosphere.

To further insure the weather-tight condition of plug 12 and to reinforce the electrical connections therein against mechanical shock, the interior of plug 12 may be filled with a suitable potting compound applied at low pressure through a potting hole 100 in plug housing 30 (FIGS. 2 and 3). Upon completion of the potting operation, potting hole 100 may be sealed with a cap screw or similar covering member.

Where still further sealing may be required, as for example when the system of the invention is gas pressurized, sealing compound may be used. The sealing compound which is normally supplied in tape or cord form may be placed between the mating portions of plug 12 and socket 24, and around cable 10 where it enters plug 12.

Referring now to FIG. 4, socket terminal block **66*a*, opposite socket terminal block 66 in socket housing 68, is mounted identically to block 66; however, it is desirable that blocks 66 and 66*a* be capable of mating in an identical manner with the interchangeable plugs at either end of the cable units of the invention. This eliminates plug selection by the installer and the possibility of crossed connections. Accordingly, the terminal sleeves 64** (FIG. 5) in the terminal block at one end of socket housing 68 are transpositioned with respect to the corresponding terminal sleeves 64 in the terminal block at the opposite end thereof. The need for transpositioning can be seen with reference to FIGURE 4; if, for example, we consider wire pair 102, it is connected through terminal pins 58a to terminal sleeves adjacent the upper end of socket terminal block 66 as viewed in FIG. 4. If the terminal sleeves in block 66 were electrically connected straight through socket 24 to corresponding terminal sleeves in socket terminal block 66a, electrical connection would be made at the upper end of block 66a as viewed in FIG. 4. Under these conditions, it can be seen that if plug 12a were then mated with block 66a, wire pair 102 connected to pins 58a in plug 12 would be electrically connected to pins 58b on plug 12a. But, pins 58b do not electrically connect to wire pair 102 in plug 12a; therefore, electrical continuity between corresponding wire pairs would be lost in passing through socket 24.

To prevent the above result, the connectors 104 between the terminal sleeves in socket terminal blocks 66 and 66a are criss-crossed as shown in FIG. 4. Thus, connectors 104′ which are connected at one end to pins 58a in plug 12 will also electrically connect with corresponding pins 58a in plug 12a mated with block 66a. The terminal sleeves in socket terminal block 66a are thus transpositioned with respect to corresponding terminal sleeves in socket terminal block 66, as the term "transpositioned" is used herein in the specification and claims.

In the embodiment of the communication line system illustrated in FIGS. 1–6, the terminals in plug 12 have been shown as male pins 58 while the terminals in socket 24 have been shown as female sleeves 64; however, it will be understood that this relationship may be reversed or that combinations of both male and female terminals may be used in either the plug terminal blocks 54 or in the socket terminal blocks 66.

The interior of socket housing 68 may also be filled with a potting compound for the same purpose and in the same manner as hereinabove described for plug 12, and thus preferably a potting hole 106 is provided in socket housing 68 as shown in FIGS. 2 and 3.

As discussed hereinabove, at least selected ones in many instances all of the sockets 24 in the communication line system of the invention are provided with means for tapping-in to the wire pairs in associated cable units. Tapping-in is necessary in order to provide "drop-lines" or to interconnect associated communication equipment or test equipment with the system.

A tap-in is accomplished by means of a tap-off plug 28 electrically connected to a tap-off cable 26 (FIG. 2). Plug 28 is similar to plug 12 described hereinabove and it is connected to tap-off cable 26 and socket 24 in the same manner as plug 12 is connected respectively to cable 10 and socket 24 (see FIGS. 2, 3 and 6). Normally, however, tap-off cable 26 has fewer wire pairs than the length of communication cable 10 in cable units 14. Thus, for example plug 28 may contain two tap-off plug terminal blocks 106 and 108 (FIG. 6) each containing fifty terminal pins 58 so that a total of fifty wire pairs (100 wires) may be connected thereto, with each plug 12 containing four fifty pin terminal blocks 54 (FIG. 3) for connecting one hundred wire pairs (200 wires). The numbers of plug terminal blocks and tap-off plug terminal blocks may, however, be varied to suit the particular application without departing from the scope of the present invention.

Generally, the number of terminal blocks in the portions of socket 24 which mate with either plugs 12 or plug 28 will exactly correspond to the number of terminal blocks in the mating plug.

Figure 6:
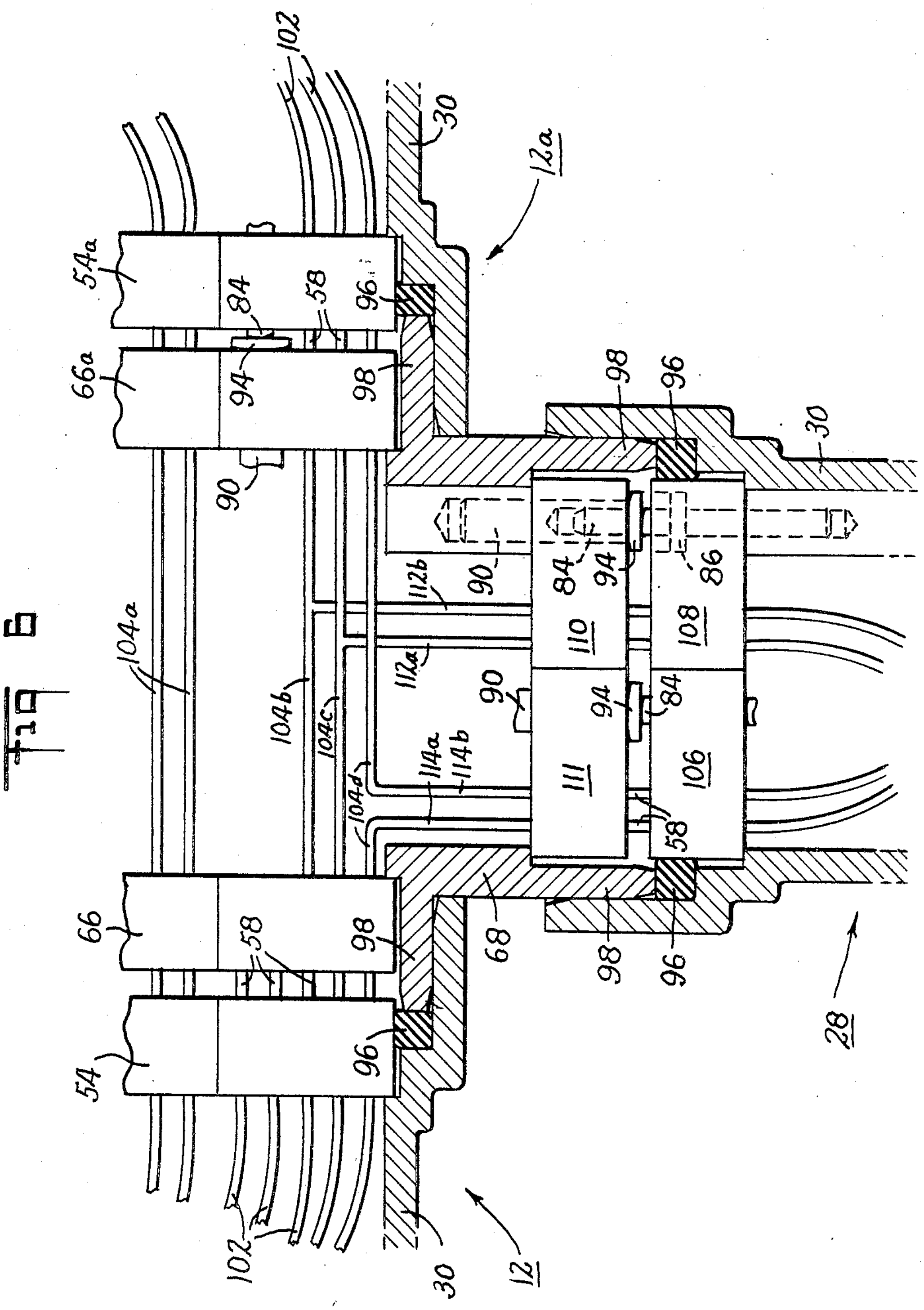
FIG. 6 is a partial sectional view taken along line 6—6 of FIG. 4.

Tap-in electrical connections are affected as shown in FIG. 6. Tap-in terminal blocks 110, 111 similar to socket terminal blocks 66 and 66a described hereinabove, are secured adjacent a third open side of socket 24 in the same manner as socket terminal blocks 66, 66a are secured adjacent their respective open sides of socket 24.

In some instances, no tap-in may be required for a selected wire pair and therefore a straight-through connector 104a (FIG. 6) may link the terminal sleeves of blocks 66 and 66a. However, where a parallel tap-in is required as for testing instrumentation, etc., tap wires such as shown at 112a, 112b (FIG. 6) are provided to link selected connectors 104b, 104c in the interior of socket 24 with separate terminal sleeves in tap-in terminal block 110.

Where a series tap-off is desired, the connector 104d between corresponding terminal sleeves in blocks 66 and 66a is made discontinuous as shown in FIG. 6, and tap wires 114a and 114b electrically link each portion of connector 104d with a separate terminal sleeve in tap-in terminal block 110.

The connections between the terminal sleeves in block 110, and the tap wires 112a, 112b or 114a, 114b are made similarly to the connection between terminal sleeve 64 and connector 104 shown in FIG. 5. Also, it will be understood that the number, type, or combination of types of tap-in connections may be varied in accordance with specific requirements in each socket 24 of the communication line system of the invention.

Where the structural strength and weather resistant characteristics of the embodiment shown in FIGS. 1–6 are not needed, as for example in indoor applications, a simplified communication line system can be used.

Figure 7:
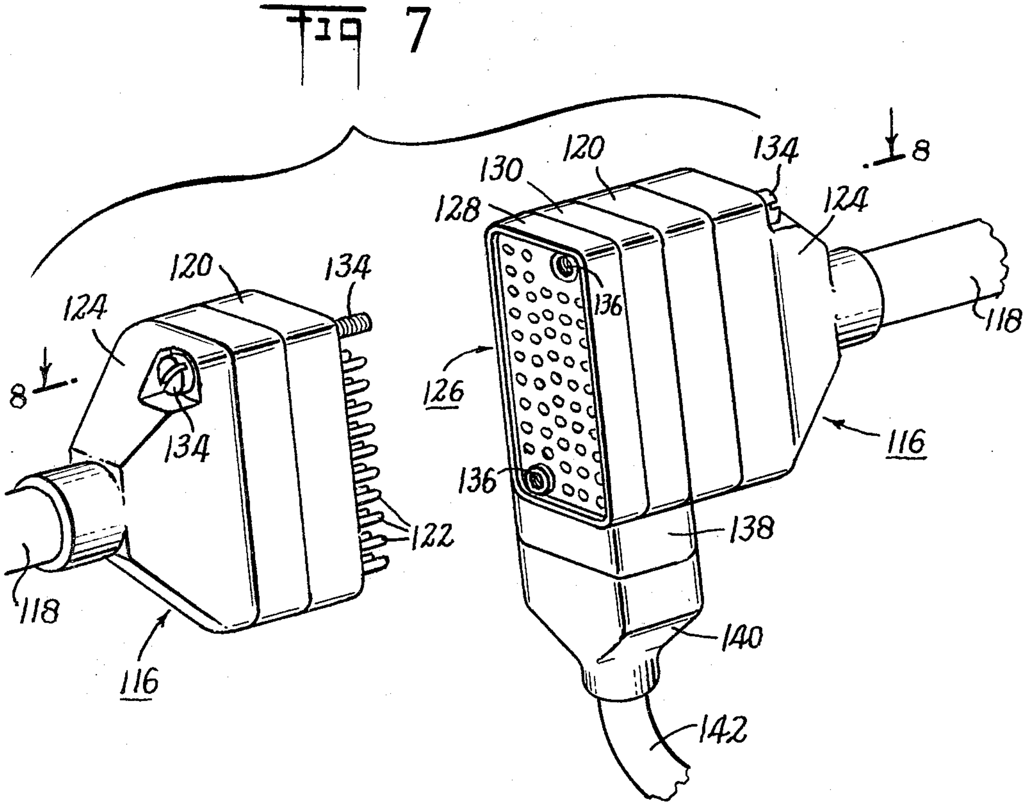
FIG. 7 is a partially exploded perspective view of another embodiment of the invention.

Referring to FIG. 7, a plug 116 is secured to each end of a length of communication cable 118 to form the cable unit of this embodiment of the invention. Since the cable lengths for indoor applications are generally short and the cable light, manipulation is easy. Accordingly, the plugs at either end of cable 118 can differ; for example, they may be mirror images of each other. Each plug 116 comprises a plug terminal block 120 of insulating material having a plurality of terminal pins 122 molded or inserted therein. The wire pairs comprising the core of cable 118 are spread out and electrically connected to the terminal pins 122 in the same manner as heretofore described for the embodiment of FIGS. 1–6. A protective cap 124 is threaded over the end of cable 118 and abuts the rear of plug terminal block 120 to enclose the spread out wire pairs and protect them from damage.

The cable units thus formed are interconnected by an intermediate socket 126. Socket 126 comprises two socket terminal blocks 128 and 130 disposed back to back and frictionally secured by a plurality of terminal sleeves 132 (FIG. 8) which span the interface between blocks 128 and 130. The number and disposition of terminal sleeves 132 correspond to the number and disposition of terminal pins 122 so that a pair of plugs 116 on adjacent ends of two separate cable units may be mated with one socket 126 to form a continuous communication line system. It can be seen that transpositioning of terminal sleeves 132 is not necessary when mirror image plugs 116 are used on the cable unit of this embodiment.

Figure 8:
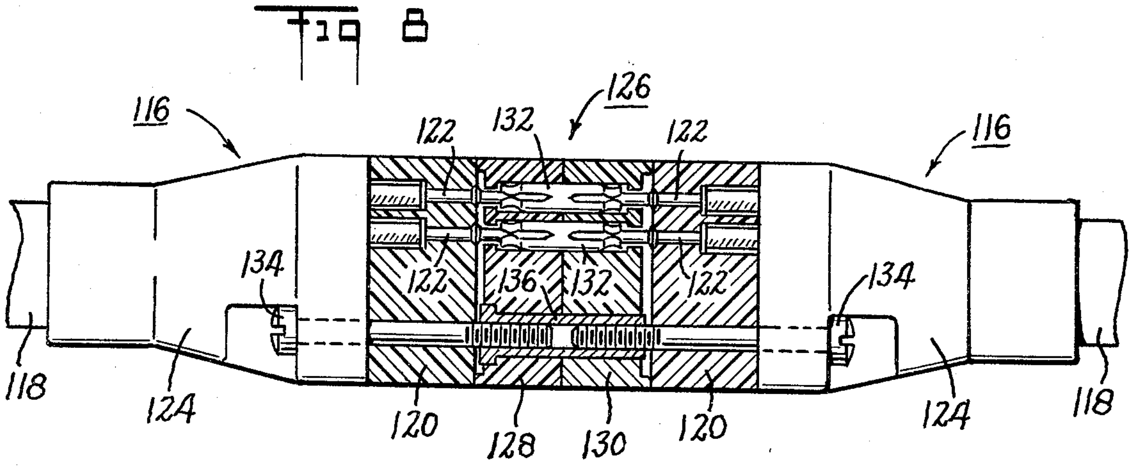
FIG. 8 is a sectional view taken along line 8—8 of FIG. 7 and showing the apparatus of FIG. 7 in assembly.

A pair of bolts 134 passing through diagonal corners of protective cap 124 and plug terminal block 120 are each threadedly engaged within a sleeve 136 spanning the interface between blocks 128 and 130. Bolts 134 serve both to align the pins 122 in plug terminal block 120 with the corresponding sleeves 132 in socket terminal blocks 128 or 130, and to secure each plug 116 to its mating socket 126 as shown in FIG. 8.

Tap-ins may be provided to the terminal sleeves 132; as shown in FIG. 7, a tap-in terminal block 138 is provided along one side of socket 126. Tap-in terminal block 138 contains a number of terminal sleeves similar to the terminal sleeves 64 shown in FIG. 5. Parallel and/or series tap-in electrical connections may be provided between the terminal sleeves 132 in socket 126 and the terminal sleeves in tap-in terminal block 138 in much the same manner as is illustrated in FIG. 6.

A tap-off plug 140, similar to plug 116 but normally having fewer terminal pins, is electrically connected to a tap-off cable 142 in the manner plug 116 is connected to cable 118. Tap-off plug 140 is mated with tap-in terminal block 138 in the same manner as plug 116 mates with socket terminal blocks 128 or 130 to provide a tap-off connection for this embodiment of the invention.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. A prefabricated communication line system comprising in combination:

(A) a plurality of cable units each comprising
  (1) a predetermined length of communication cable having a core comprising a plurality of wire pairs,
  (2) a multi-terminal connector plug at each end of said cable length for electrical connection of said wire pairs to a mating socket member,
    (a) said plugs being interchangeable on any given cable unit,
(B) an intermediate socket interconnecting the plugs of successive cable units,
  (1) each said socket having means for mating with either plug of a first cable unit on a first side of said socket and with either plug of a second cable unit on a second side of said socket, and
  (2) having socket terminals for electrically connecting with the terminals on the plug to which it is mated, and
  (3) a transposed interconnection between said socket terminals within said socket to provide interchangeability of plugs while maintaining electrical continuity,
(C) tap-in connection means on a third side of said intermediate socket,
  (1) said tap-in connection means including tap-in terminals electrically connected to one or more of said socket terminals;

whereby connection of said cable units into a communication system may be accomplished in the field by interchangeably connecting either plug of a first length of cable to said first side of said socket, connecting either plug of a second cable length with said second side of said socket and interconnecting a tap-off plug for drop-lines, repeaters, test equipment, and the like to the tap-in terminals on said third side of said socket.

2. A prefabricated communication line system comprising in combination:

(A) a plurality of cable units, each comprising,
  (1) a length of communication cable having a core comprising a plurality of wire pairs, and
  (2) interchangeable, multi-terminal connector plugs mounted on each end of said length of communication cable, each said plug comprising,
    (a) a plug housing having an open end, and
    (b) at least one plug terminal block supported in said plug housing adjacent said open end, said plug terminal block having means providing terminals for said wire pairs, and
(B) a plurality of modular intermediate sockets interconnecting said cable units, each said socket comprising,
  (1) a socket housing open at two sides thereof,
  (2) at least one socket terminal block supported adjacent each open side of said socket housing,
    (a) each said socket terminal block having terminals electrically connectable to the terminals in either of said plugs on a given cable length,
    (b) electrical connections from said terminals adjacent one side of said socket housing to corresponding terminals adjacent the other side of said socket housing to provide electrical continuity through said socket, and
    (c) tap-in connection means comprising a third open side in at least selected ones of said sockets, at least one tap-in terminal block supported adjacent said third open side, and terminals in said tap-in terminal block electrically connected with terminals in said socket terminal blocks.

3. A prefabricated communication line system as defined in claim 2 wherein said plugs at each end of said length of communication cable are substantially identical, and wherein said terminals in said socket terminal block at one end of said socket housing are transpositioned with respect to the corresponding terminals at the other end of said socket housing to permit substantially identical mating of said socket with plugs on either of the ends of two separate cable units to electrically interconnect corresponding wire pairs in said cable units.

4. A prefabricated communication line system comprising, in combination:

(A) a plurality of cable units, each comprising,
  (1) a length of communication cable having a core comprising a plurtlity of wire pairs, and
  (2) interchangeable multi-terminal plugs for connecting said cable units mounted on each end of said cable,
    (a) each said plug means being electrically connected with the wire pairs forming said core for electrical continuity in said syster, and
(B) a plurality of modular intermediate sockets,
  (1) each said socket having means for mating with a air of said lugs on adjacent ends of two searate cable units to eelctrically interconnect wire airs in said two cable units, and
  (2) at least selected ones of said sockets including tap-in connection means at one side thereof for interconnecting a tap-off lug with wire pairs in said cable units;

whereby said plurality of cable units can be electrically connected end-to-end in situ by means of said plugs and said sockets to form a communication line system.

References Cited

UNITED STATES PATENTS

| | | |
|---|---|---|
| 2,218,545 | 10/1940 | Morten. |
| 2,265,341 | 12/1941 | Borchert. |
| 3,158,680 | 11/1964 | Lovitt et al. |

FOREIGN PATENTS

| | | |
|---|---|---|
| 113,800 | 3/1918 | Great Britain. |
| 463,631 | 7/1928 | Germany. |

KENNETH DOWNEY, Primary Examiner

U.S. Cl. X.R.

174—34, 41, 72, 88; 339—153, 197